(12) United States Patent
Trachtman

(10) Patent No.: US 10,594,486 B1
(45) Date of Patent: Mar. 17, 2020

(54) PASSWORD IDENTIFICATION SYSTEM AND METHOD

(71) Applicant: EMC Corporation, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/755,667

(22) Filed: Jun. 30, 2015

(51) Int. Cl.
*H04L 9/32* (2006.01)

(52) U.S. Cl.
CPC .................. *H04L 9/3226* (2013.01)

(58) Field of Classification Search
CPC ...................................... H04L 9/3226
See application file for complete search history.

(56) References Cited

U.S. PATENT DOCUMENTS

| | | | | |
|---|---|---|---|---|
| 2003/0204733 A1* | 10/2003 | Krulce | ................... | G06F 21/31 713/183 |
| 2006/0271789 A1* | 11/2006 | Satomura | ................ | G06F 21/41 713/183 |
| 2007/0033642 A1* | 2/2007 | Ganesan | ............. | H04L 63/0428 726/10 |
| 2008/0133905 A1* | 6/2008 | Challener | ............. | H04L 9/0822 713/156 |
| 2012/0102322 A1* | 4/2012 | O'Brien | ................ | H04L 9/3271 713/168 |
| 2014/0241523 A1* | 8/2014 | Kobres | ................... | G06F 21/71 380/28 |
| 2015/0143124 A1* | 5/2015 | Bergqvist | ............... | B67D 7/085 713/171 |
| 2015/0262170 A1* | 9/2015 | Bouda | ..................... | G06F 21/44 705/67 |
| 2015/0287289 A1* | 10/2015 | Lewis | ................... | G07F 19/201 235/379 |

OTHER PUBLICATIONS

Aliasgari et al., Sesame: a secure and convenient mobile solution for passwords, IEEE, 2015 First Conference on Mobile and Secure Services (MOBISECSERV), Apr. 2, 2015 (Year: 2015).*
Banyal et al., Multi-factor Authentication Framework for Cloud Computing, IEEE, 2013 Fifth International Conference on Computational Intelligence, Modelling and Simulation, Nov. 14, 2013 (Year: 2013).*

* cited by examiner

*Primary Examiner* — Luu T Pham
*Assistant Examiner* — Harvey I Cohen
(74) *Attorney, Agent, or Firm* — Brian J. Colandreo; Mark H. Whittenberger; Holland & Knight LLP

(57) ABSTRACT

A method, computer program product, and computing system for receiving a key indicator and an encrypted password concerning an electronic device to be accessed. The key indicator may be processed to identify a decryption key. The encrypted password may be processed with the decryption key to generate a decrypted password.

24 Claims, 2 Drawing Sheets

PASSWORD IDENTIFICATION SYSTEM AND METHOD

TECHNICAL FIELD

This disclosure relates to password identification systems and, more particularly, to password identification systems that use encryption keys.

BACKGROUND

Computer systems (e.g., data storage systems) often have special accounts called "service" accounts that are available to service technicians servicing these systems. When these accounts are created, default passwords are assigned, which are well known. This, in turn, may result in unauthorized people accessing these "service" accounts.

Often times and in order to avoid such a situation, these default passwords are changed. Unfortunately, this often results in the new password not being properly stored or documented and subsequently being lost (due to technician turnover/reassignment or people simply forgetting them).

SUMMARY OF DISCLOSURE

In one implementation, a computer-implemented method is executed on a computing device. The computer-implemented method includes receiving a key indicator and an encrypted password concerning a device to be accessed. The key indicator may be processed to identify a decryption key. The encrypted password may be processed with the decryption key to generate a decrypted password.

One or more of the following may be included. Receiving a key indicator and an encrypted password may include receiving the key indicator and the encrypted password via a keyboard system included within the computing device. Receiving a key indicator and an encrypted password may include receiving the key indicator and the encrypted password via an optical scanning system included within the computing device. The key indicator may be an asymmetric public key of a public/private key pair and the decryption key may be an asymmetric private key of the public/private key pair. The key indicator may be an index identifier associated with the decryption key. The decrypted password may be displayed on a display included within the computing device. The decrypted password may be transmitted from the computing device to the device to be accessed.

In another implementation, a computer program product resides on a computer readable medium that has a plurality of instructions stored on it. When executed by a processor, the instructions cause the processor to perform operations including receiving a key indicator and an encrypted password concerning a device to be accessed. The key indicator may be processed to identify a decryption key. The encrypted password may be processed with the decryption key to generate a decrypted password.

One or more of the following may be included. Receiving a key indicator and an encrypted password may include receiving the key indicator and the encrypted password via a keyboard system included within the computing device. Receiving a key indicator and an encrypted password may include receiving the key indicator and the encrypted password via an optical scanning system included within the computing device. The key indicator may be an asymmetric public key of a public/private key pair and the decryption key may be an asymmetric private key of the public/private key pair. The key indicator may be an index identifier associated with the decryption key. The decrypted password may be displayed on a display included within the computing device. The decrypted password may be transmitted from the computing device to the device to be accessed.

In another implementation, a computing system includes a processor and memory configured to perform operations including receiving a key indicator and an encrypted password concerning a device to be accessed. The key indicator may be processed to identify a decryption key. The encrypted password may be processed with the decryption key to generate a decrypted password.

One or more of the following may be included. Receiving a key indicator and an encrypted password may include receiving the key indicator and the encrypted password via a keyboard system included within the computing device. Receiving a key indicator and an encrypted password may include receiving the key indicator and the encrypted password via an optical scanning system included within the computing device. The key indicator may be an asymmetric public key of a public/private key pair and the decryption key may be an asymmetric private key of the public/private key pair. The key indicator may be an index identifier associated with the decryption key. The decrypted password may be displayed on a display included within the computing device. The decrypted password may be transmitted from the computing device to the device to be accessed.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
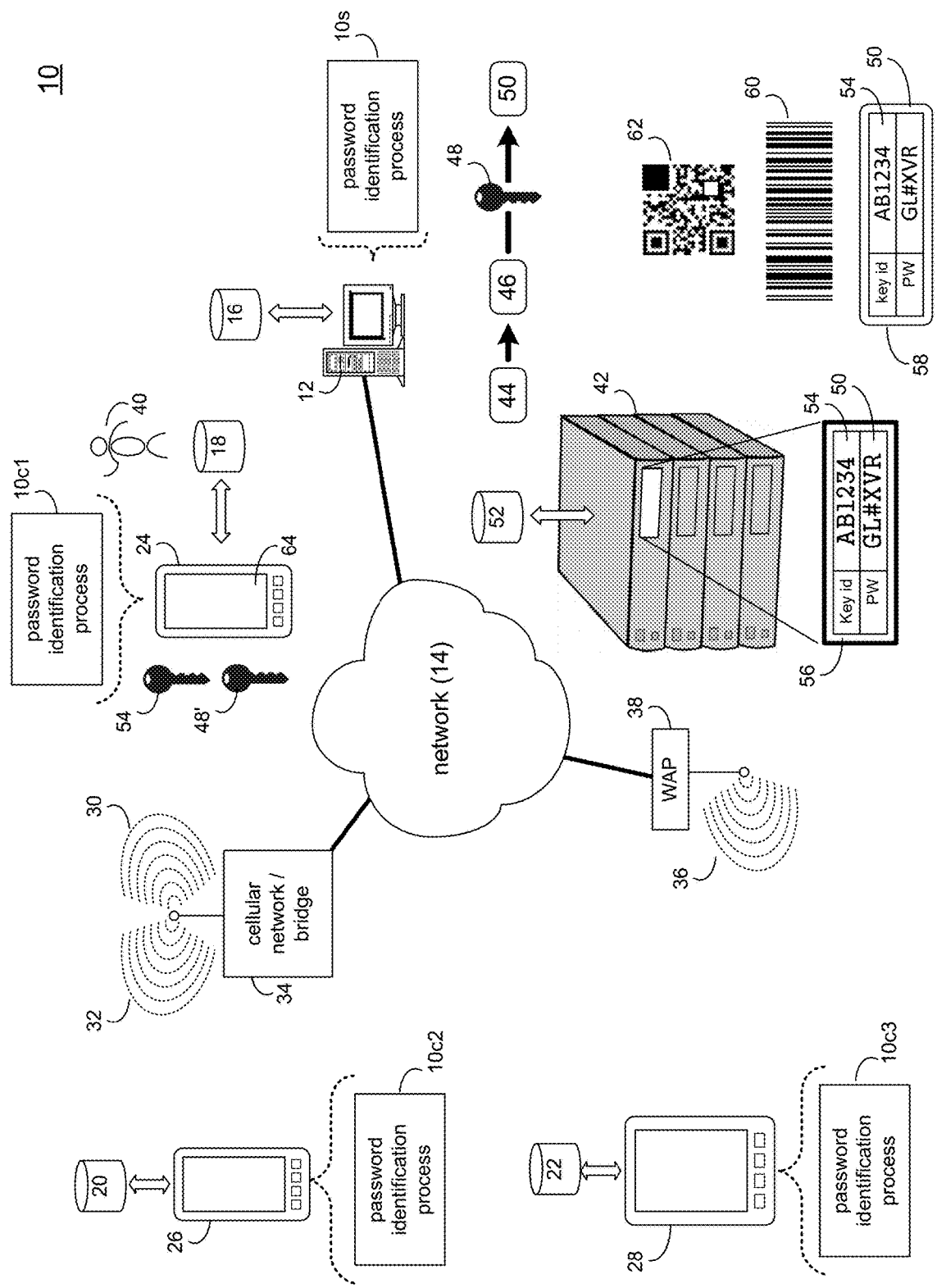
FIG. 1 is a diagrammatic view of a password indication process coupled to a distributed computing network.

System Overview:

Referring to FIG. 1, there is shown password indication process 10. As will be discussed below in greater detail, password indication process 10 may be configured to decrypt an encrypted password (for an electronic device to be accessed) based upon a key indicator, wherein the key indicator may be processed to identify a decryption key.

Password indication process 10 may be implemented as a server-side process, a client-side process, or a hybrid server-side/client-side process. For example, password indication process 10 may be implemented as a purely server-side process via password indication process 10s. Alternatively, password indication process 10 may be implemented as a purely client-side process via one or more of password indication process 10c1, password indication process 10c2, and password indication process 10c3. Alternatively still, password indication process 10 may be implemented as a hybrid server-side/client-side process via password indication process 10s in combination with one or more of password indication process 10c1, password indication process 10c2, and password indication process 10c3. Accordingly, password indication process 10 as used in this disclosure may include any combination of password indication process 10s, password indication process 10c1, password indication process 10c2, and password indication process 10c3.

Password indication process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of password indication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Examples of password indication processes 10c1, 10c2, 10c3 may include but are not limited to a web browser, a portable device user interface, a game console user interface, or a specialized application/applet. The instruction sets and subroutines of password indication processes 10c1, 10c2, 10c3, which may be stored on storage devices 18, 20, 22 (respectively) coupled to electronic devices 24, 26, 28 (respectively), may be executed by one or more processors (not shown) and one or more memory architectures (not shown) incorporated into electronic devices 24, 26, 28 (respectively). Examples of storage devices 18, 20, 22 may include but are not limited to: hard disk drives; tape drives; optical drives; RAID devices; random access memories (RAM); read-only memories (ROM), and all forms of flash memory storage devices.

Examples of electronic devices 24, 26, 28 may include, but are not limited to, smart phone 24, smart phone 26, and tablet computer 28. Electronic devices 24, 26, 28 may each execute an operating system, examples of which may include but are not limited to Microsoft Windows™ OS, Apple Macintosh™ OS, Apple iOS™, Google Android™, Google Chrome OS™, UNIX™ OS or Linux™ OS.

The various electronic devices (e.g., electronic devices 24, 26, 28) may be directly or indirectly coupled to network 14. For example, electronic device 24 (e.g., a smartphone) and electronic device 26 (e.g., a smartphone) are shown wirelessly coupled to network 14 via wireless communication channels 30, 32 (respectively) established between electronic device 24 and electronic device 26 and cellular network/bridge 34. Further, electronic device 28 (e.g., a tablet computer) is shown wirelessly coupled to network 14 via wireless communication channel 36 established between electronic device 28 and wireless access point (i.e., WAP) 38, which is shown directly coupled to network 14.

WAP 38 may be, for example, an IEEE 802.11a, 802.11b, 802.11g, 802.11n, Wi-Fi, acoustic, and/or Bluetooth device that is capable of establishing: wireless communication channel 36 between tablet computer 28 and WAP 38. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Password Indication System:

For the following example, assume that user 40 is a service technician that is at a customer's site (e.g., a data center) and needs to perform maintenance on electronic device 42. As discussed above, computer systems (e.g., electronic device 42) often have special "service" accounts that are available to service technicians (e.g., user 40) servicing these systems. Examples of electronic device 42 may include but are not limited to: a Network Attached Storage (NAS) system, a Storage Area Network (SAN), a personal computer with a memory system, a server computer with a memory system, a data switch/router, a communication device (e.g., a PBX or network interface), and a cloud-based device with a memory system.

The above-referenced data center may include many different pieces of serviceable equipment (i.e., in addition to electronic device 42). Vendors (or other servicing entities) may control which service technicians have access to which pieces of equipment by controlling which service technicians have access to the ability to map key indicators to decryption keys.

For example, if a data center has both EMC™ and IBM™ equipment; EMC™ may use such an approach to grant their service people access to EMC™ equipment without risking that these EMC™ service technicians will be able to access the IBM™ equipment. Similarly, EMC™ may segment their equipment (by e.g., equipment type, equipment value, and physical location) and may define the pieces of equipment that each EMC™ service technician may access by selectively providing, to each EMC™ service technician, the ability to map key indicators to decryption keys for only those pieces of equipment that the specific EMC™ service technician is authorized to access.

One of the key benefits of this approach is that it does not require that the service technician (or the data center housing the equipment) have network access to the outside world. Thus, even if the equipment is at a "black site" that is not network connected to the outside world, the service technician may still be able to use this approach to provide service access to appropriate service technicians.

Additionally, other situations may benefit from this approach. For example, when a vehicle (e.g., a tank, a truck, an airplane or a boat) has many different users that are allowed to access/operate it via a password, such an approach may allow any authorized user to operate that equipment even after passwords have changed.

In many cases, it may be important to ensure that it is difficult to reverse compile the device (e.g., electronic device 24) used to access the equipment in question. Thus, if it is desired to revoke the access of a specific service technician to a specific device, when e.g., the device (e.g., electronic device 24) is network connected, the appropriate key indicators may be disabled, the appropriate applications may be removed, or the device (e.g., electronic device 24) may be physically confiscated.

As discussed above, when these account are created, default passwords are assigned, which may be well known (which may result in unauthorized people accessing these "service" accounts). Often times and in order to avoid such a situation, these default passwords may be changed, which often results in the new password not being properly stored/ documented, thus creating problems when a technician shows up to service e.g., electronic device 42 and does not know the current password.

Setting the Password:

Assume that electronic device 42 has default password 44 (e.g., "password") that is known to user 40 and, upon completing the service call, user 40 wishes to change default password 44 (e.g., "password") to something new to enhance the security of electronic device 42. Accordingly and using a password changing procedure defined by electronic device 42, user 40 may change default password 44. Assume for illustrative purposes that user 40 changes default password 44 (e.g., "password") to password 46 (e.g., "Alyssa"), which is the name of the oldest daughter of user 40.

Electronic device 42 may encrypt password 46 using encryption key 48 to generate encrypted password 50 (e.g., GL#XVR). Encryption key 48 may be stored on storage device 52 coupled to electronic device 42. Examples of storage device 52 may include but are not limited to: hard disk drives; tape drives; optical drives; RAID devices; random access memories (RAM); read-only memories (ROM), and all forms of flash memory storage devices. For this particular illustrative example, encryption key 48 may be the asymmetric public encryption key of a private/public key pair or may be a symmetric encryption key.

As is known in the art, private/public key pairs are a type of asymmetric cryptography, which is a class of cryptographic protocols that are based upon algorithms that require two separate keys (e.g., a private key and a public key), one of which is publically available (e.g., public key 48) and one of which is secret (e.g., private key 54). Although these keys (e.g., keys 48, 54) are different, keys 48, 54 are mathematically linked and complimentary with respect to each other. For example, a public key of an intended recipient may be used to encrypt data that may then be provided to the recipient in an encrypted form. Since this data was encrypted using the public key, the only way to decrypt the data is using the related private key (which is held in secret by the recipient). Accordingly, only the recipient may decrypt the encrypted data. Therefore and if encryption key 48 is an asymmetric public encryption key of a private/public key pair, the only way that encrypted password 50 may be decrypted is through the use of asymmetric private encryption key 54, which may be stored on smart phone 24 (e.g., on storage device 18).

Specifically and with respect to private/public key pair systems, the private key generally may not be computed in any reasonable amount of time from the public key (e.g., using today's technology and equipment, it may take centuries to determine a private key from its corresponding public key). However and given infinite time and resources, the private key may be mathematically determined from the public key.

Additionally and in some private/public key pair systems, neither the public key nor the private key may be computed in a reasonable amount of time from the other key. However and in other private/public key pair systems, the relationship may be asymmetric and the public key may be computed in a reasonable amount of time from the private key. For this disclosure and without loss of generality, the "private key" is intended to be interpreted as the key that may not be computed from the other in a reasonable amount of time. If both of the keys in a private/public key pair system have this property, then either of the keys may be designated as the "private key" and the other key may be designated the "public key"

Further and as is known in the art, a symmetric encryption key is an encryption key that is bidirectional in nature and may be used to encrypt data and then may be used to decrypt the encrypted data. Therefore and if encryption key 48 is a symmetric encryption key, the only way that encrypted password 50 may be decrypted is through the use of symmetric encryption key 48, a copy of which (e.g., symmetric encryption key 48') may be stored on smart phone 24 (e.g., on storage device 18).

In order to effectuate the decryption of encrypted password 50 so that access to electronic device 42 may be granted to a technician, key indicator 54 (to be discussed below in greater detail) and encrypted password 50 may be made publically available to technicians that are servicing electronic device 42. While both the encrypted password and the key indicator may be generally publically available to non-authorized users, the decrypted password may not be effectively determined from the encrypted password and key indicator (for the reasons discussed above). Therefore, there is no undue risk that such an unauthorized user may be able to access electronic device 42.

For example, key indicator 54 and encrypted password 50 may be rendered/displayed on display screen 56 included within electronic device 42. Accordingly, when electronic device 42 encrypts password 46 using encryption key 48 to generate encrypted password 50 (e.g., GL#XVR), key indicator 54 and encrypted password 50 may be automatically rendered/displayed on display screen 56 and may be rendered/displayed at a later date by e.g., pushing one or more buttons (not shown) included within electronic device 42.

Alternatively, key indicator 54 and encrypted password 50 may be handwritten or printed onto label 58. Accordingly and when electronic device 42 encrypts password 46 using encryption key 48 to generate encrypted password 50 (e.g., GL#XVR), key indicator 54 and encrypted password 50 may be automatically rendered/displayed on display screen 56 and user 40 may handwrite key indicator 54 and encrypted password 50 onto label 58 (which may be affixed to electronic device 42 for subsequent use by e.g., a technician).

Further and when electronic device 42 encrypts password 46 using encryption key 48 to generate encrypted password 50 (e.g., GL#XVR), key indicator 54 and encrypted password 50 may be printed (e.g., by a printing device (not shown) accessible by electronic device 24 and/or electronic device 42) onto human-readable label 58 (e.g., a tag that identifies key indicator 54 and encrypted password 50), machine-readable bar code 60 (e.g., which includes key indicator 54 and encrypted password 50 encoded therein), machine-readable QR code 62 (e.g., which includes key indicator 54 and encrypted password 50 encoded therein) or any other type/form of machine readable representation of the encrypted password and key indicator. Human-readable label 58, machine-readable bar code 60 and/or machine-readable QR code 62 may be affixed to electronic device 42 for subsequent use by e.g., a technician.

As discussed above, display screen 56, human-readable label 58, machine-readable bar code 60 and machine-readable QR code 62 may all define encrypted password 50 and key indicator 54, wherein key indicator 54 may be used to identify the key that is capable of decrypting encrypted password 50 to generate password 46.

As discussed above, encryption key 48 may be an asymmetric public encryption key of a private/public key pair or a symmetric encryption key. In the event that encryption key 48 is an asymmetric public encryption key of a private/public key pair, key indicator 54 may be the asymmetric public encryption key. For example and being key indicator 54 identifies encryption key 48 (i.e., the asymmetric public encryption key of a private/public key pair), encryption key 48 may be utilized to identify the related asymmetric private encryption key so that this asymmetric private encryption key may be used to decrypt encrypted password 50 and generate password 46.

In the event that encryption key 48 is a symmetric encryption key, key indicator 54 may be an index entry within an index (not shown). For example and being key indicator 54 identifies an index entry, this index entry may be utilized to identify the symmetric encryption key that was utilized to generate encrypted password 50 so that the same symmetric encryption key may be used to decrypt encrypted password 50 and generate password 46. For this disclosure, the term "index" may be any information or representation that serves to point out the correct decryption key. Examples may include, but not limited to, a numerical index into a table, or an arbitrary string that serves as a hash code key into a hash table.

Determining the Password:

As discussed above and in order to effectuate the decryption of encrypted password 50 so that access to electronic device 42 may be granted to a technician, key indicator 54 and encrypted password 50 may be made publically available to technicians that are servicing electronic device 42. For the following example, assume that sometime in the future, user 40 attempts to service electronic device 52 but cannot remember password 46 (e.g., "Alyssa"), as he has several children and often uses the names of family members as passwords. Therefore, user 40 may use key indicator 54 and encrypted password 50 (e.g., which are defined within display screen 56, human-readable label 58, machine-readable bar code 60 and machine-readable QR code 62) to determine password 46.

Figure 2:
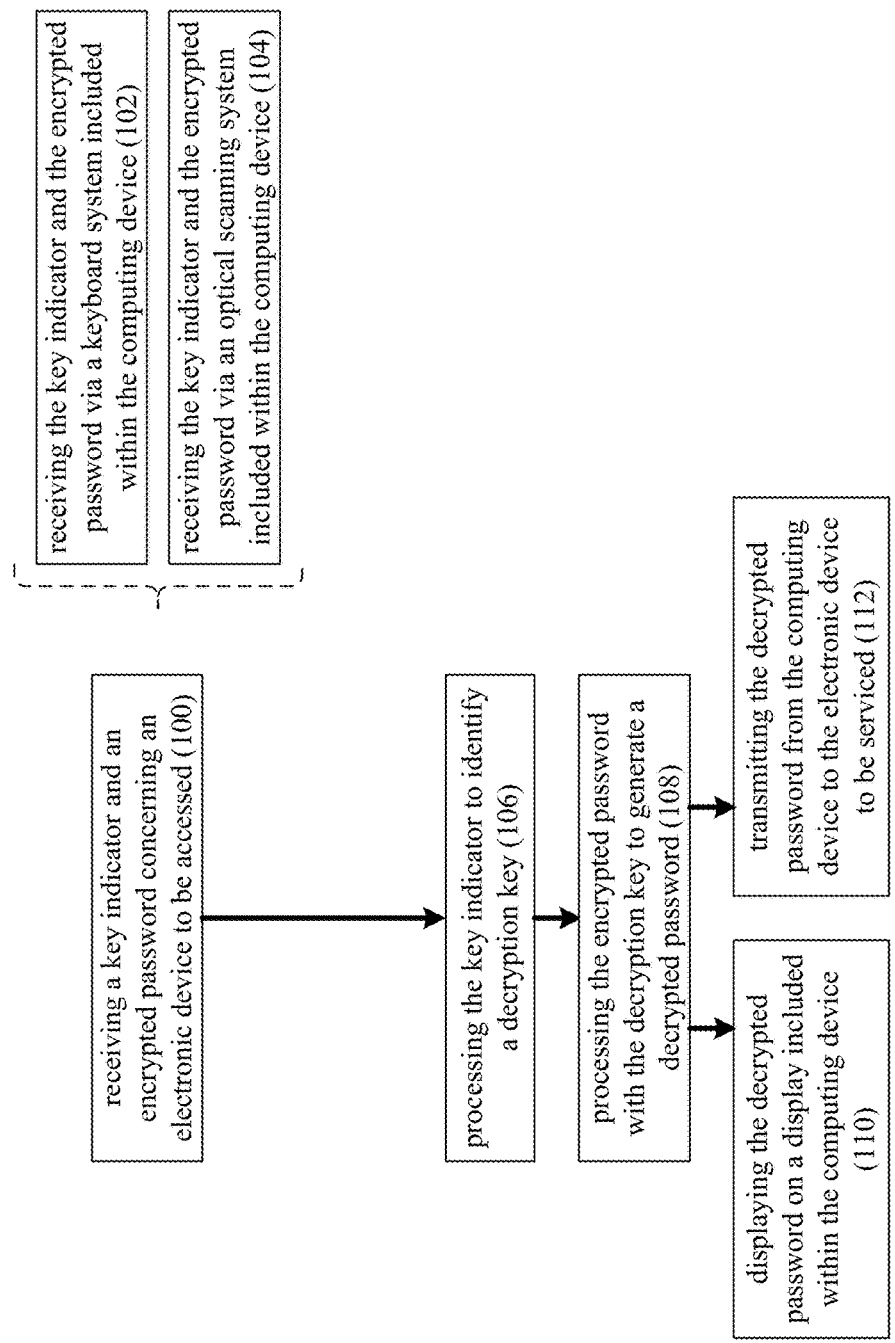
FIG. 2 is a flow chart of one implementation of the password indication process of FIG. 1.

Referring also to FIG. 2, password indication process 10 may receive 100 key indicator 54 and encrypted password 50 concerning electronic device 42 to be accessed.

If key indicator 54 and encrypted password 50 are defined within display screen 56 and/or human-readable label 58, user 40 may manually provide key indicator 54 and encrypted password 50 to password indication process 10. Specifically and when receiving 100 key indicator 54 and encrypted password 50, password indication process 10 may receive 102 key indicator 54 and encrypted password 50 via e.g., a keyboard system (not shown) included within/coupled to electronic device 24. Accordingly, user 40 may read key indicator 54 and encrypted password 50 from display screen 56 and/or human-readable label 58 and may enter this information into electronic device 24 via this keyboard system so that key indicator 54 and encrypted password 50 may be received 102 by password indication process 10.

If key indicator 54 and encrypted password 50 are defined within machine-readable bar code 60 and machine-readable QR code 62, user 40 may provide key indicator 54 and encrypted password 50 to password indication process 10 by scanning machine-readable bar code 60 and machine-readable QR code 62, Specifically and when receiving 100 key indicator 54 and encrypted password 50, password indication process 10 may receive 104 key indicator 54 and encrypted password 50 via e.g., an optical scanning system (not shown) included within/coupled to electronic device 24. Accordingly, user 40 may use electronic device 24 to scan machine-readable bar code 60 and machine-readable QR code 62 so that key indicator 54 and encrypted password 50 may be received 104 by password indication process 10.

As discussed above, encryption key 48 may be an asymmetric public encryption key of a private/public key pair or a symmetric encryption key, wherein: a) if encryption key 48 is an asymmetric public encryption key of a private/public key pair, key indicator 54 may be the asymmetric public encryption key; and b) if encryption key 48 is a symmetric encryption key, key indicator 54 may be an index entry.

Continuing with the above-stated example, one or more encryption keys may be stored within electronic device 24, such as symmetric encryption key 48' and asymmetric encryption key 54. For the following example, assume that electronic device 24 includes hundreds of symmetric encryption keys and hundreds of asymmetric encryption keys.

Password indication process 10 may process 106 key indicator 54 to identify a decryption key. If key indicator 54 is an asymmetric public key of a public/private key pair, the decryption key may be an asymmetric private key (e.g., private key 54) of the public/private key pair. Accordingly, when password indication process 10 processes 106 key indicator 54 to identify the decryption key, password indication process 10 may identify the asymmetric private key (e.g., private key 54) that is associated with/paired with encryption key 48 (which, in this example, is an asymmetric private key of the public/private key pair).

If key indicator 54 is an index identifier, the decryption key may be a symmetric encryption key (e.g., symmetric encryption key 48') associated with index identifier 54. Accordingly, when password indication process 10 processes 106 key indicator 54 to identify the decryption key, password indication process 10 may identify the symmetric encryption key (e.g., symmetric encryption key 48') that is associated with the index identifier. For example, if the index identifier is K128, password indication process 10 may identify the symmetric encryption key (e.g., symmetric encryption key 48') that is associated with K128.

Once the appropriate decryption key (e.g., private key 54 or symmetric encryption key 48') is identified, password indication process 10 may process 108 encrypted password 50 with the decryption key (e.g., private key 54 or symmetric encryption key 48') to generate decrypted password 46.

Once decrypted password 46 is generated, password indication process 10 may display 110 decrypted password 46 on a display (e.g., display 64) included within e.g., electronic device 24. Once displayed 110, user 40 may enter decrypted password 46 into electronic device 42 so that user 40 may access and service electronic device 42.

Alternatively/additionally, password indication process 10 may transmit 112 (e.g., via Bluetooth or some other near field communication methodology) decrypted password 46 from electronic device 24 to electronic device 42 so that user 40 may access and service electronic device 42. Further still, device 42 may include a scanner of some sort (e.g., a camera, not shown), wherein electronic device 24 may present an image representation of the decrypted password that may be sensed and interpreted by device 42

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    receiving, at a device to be accessed, a valid default password and a new password for the device to be accessed, wherein the device to be accessed is one or more of a network attached storage system, a storage area network, a server computer, a data switch, and a cloud-based device and is located in a data center;
    encrypting, via the device to be accessed, the new password for the device to be accessed with an encryption key to generate an encrypted password in response to receiving the valid default password and the new password for the device to be accessed, wherein the encryption key is stored on the device to be accessed and has a corresponding decryption key stored on a mobile device and wherein the encrypted password replaces the valid default password for the device to be accessed;
    printing a key indicator and the encrypted password concerning the device to be accessed onto a label configured to be affixed to the device to be accessed;
    receiving, at the mobile device, the key indicator and the encrypted password concerning the device to be accessed;
    processing, at the mobile device, the key indicator to identify the corresponding decryption key, wherein the corresponding decryption key is stored on the mobile device;
    processing, at the mobile device, the encrypted password with the corresponding decryption key to generate a decrypted password;
    providing the decrypted password to the device to be accessed; and
    revoking access to the device to be accessed by disabling the key indicator stored on the mobile device.

2. The computer-implemented method of claim 1 wherein receiving the key indicator and an encrypted password includes:
    receiving the key indicator and the encrypted password via a keyboard system included within the computing device.

3. The computer-implemented method of claim 1 wherein receiving the key indicator and an encrypted password includes:
    receiving the key indicator and the encrypted password via an optical scanning system included within the computing device.

4. The computer-implemented method of claim 1 wherein the key indicator is an asymmetric public key of a public/private key pair and the decryption key is an asymmetric private key of the public/private key pair.

5. The computer-implemented method of claim 1 wherein the key indicator is an index identifier associated with the decryption key.

6. The computer-implemented method of claim 1 further comprising:
    displaying the decrypted password on a display included within the computing device.

7. The computer-implemented method of claim 1 further comprising:
    transmitting the decrypted password from the computing device to the device to be accessed.

8. A computer program product residing on a non-transitory computer readable medium having a plurality of instructions stored thereon which, when executed by a processor, cause the processor to perform operations comprising:
    receiving, at a device to be accessed, a valid default password and a new password for the device to be accessed, wherein the device to be accessed is one or more of a network attached storage system, a storage area network, a server computer, a data switch, and a cloud-based device and is located in a data center;
    encrypting, via the device to be accessed, the new password for the device to be accessed with an encryption key to generate an encrypted password in response to receiving the valid default password and the new password for the device to be accessed, wherein the encryption key is stored on the device to be accessed and has a corresponding decryption key stored on a mobile device and wherein the encrypted password replaces the valid default password for the device to be accessed;
    printing a key indicator and the encrypted password concerning the device to be accessed onto a label configured to be affixed to the device to be accessed;
    receiving, at the mobile device, the key indicator and the encrypted password concerning the device to be accessed;
    processing, at the mobile device, the key indicator to identify the corresponding decryption key, wherein the corresponding decryption key is stored on the mobile device;
    processing, at the mobile device, the encrypted password with the corresponding decryption key to generate a decrypted password;
    providing the decrypted password to the device to be accessed; and
    revoking access to the device to be accessed by disabling the key indicator stored on the mobile device.

9. The computer program product of claim 8 wherein receiving the key indicator and an encrypted password includes:
    receiving the key indicator and the encrypted password via a keyboard system included within the computing device.

10. The computer program product of claim 8 wherein receiving the key indicator and an encrypted password includes:
    receiving the key indicator and the encrypted password via an optical scanning system included within the computing device.

11. The computer program product of claim 8 wherein the key indicator is an asymmetric public key of a public/private key pair and the decryption key is an asymmetric private key of the public/private key pair.

12. The computer program product of claim 8 wherein the key indicator is an index identifier associated with the decryption key.

13. The computer program product of claim 8 further comprising instructions for:
    displaying the decrypted password on a display included within the computing device.

14. The computer program product of claim 8 further comprising instructions for:
    transmitting the decrypted password from the computing device to the device to be accessed.

15. A computing system including a processor and memory configured to perform operations comprising:

receiving, at a device to be accessed, a valid default password and a new password for the device to be accessed, wherein the device to be accessed is one or more of a network attached storage system, a storage area network, a server computer, a data switch, and a cloud-based device and is located in a data center;

encrypting, via the device to be accessed, the new password for the device to be accessed with an encryption key to generate an encrypted password in response to receiving the valid default password and the new password for the device to be accessed, wherein the encryption key is stored on the device to be accessed and has a corresponding decryption key stored on a mobile device and wherein the encrypted password replaces the valid default password for the device to be accessed;

printing a key indicator and the encrypted password concerning the device to be accessed onto a label configured to be affixed to the device to be accessed;

receiving, at the mobile device, the key indicator and the encrypted password concerning the device to be accessed;

processing, at the mobile device, the key indicator to identify the corresponding decryption key, wherein the corresponding decryption key is stored on the mobile device;

processing, at the mobile device, the encrypted password with the corresponding decryption key to generate a decrypted password;

providing the decrypted password to the device to be accessed; and revoking access to the device to be accessed by disabling the key indicator stored on the mobile device.

16. The computing system of claim 15 wherein receiving the key indicator and an encrypted password includes:

receiving the key indicator and the encrypted password via a keyboard system included within the computing device.

17. The computing system of claim 15 wherein receiving the key indicator and an encrypted password includes:

receiving the key indicator and the encrypted password via an optical scanning system included within the computing device.

18. The computing system of claim 15 wherein the key indicator is an asymmetric public key of a public/private key pair and the decryption key is an asymmetric private key of the public/private key pair.

19. The computing system of claim 15 wherein the key indicator is an index identifier associated with the decryption key.

20. The computing system of claim 15 further configured to perform operations comprising:

displaying the decrypted password on a display included within the computing device.

21. The computing system of claim 15 further configured to perform operations comprising:

transmitting the decrypted password from the computing device to the device to be accessed.

22. The computer-implemented method of claim 1 wherein one or more of the key indicator and the encrypted password are encoded in a machine-readable code.

23. The computer program product of claim 8 wherein one or more of the key indicator and the encrypted password are encoded in a machine-readable code.

24. The computing system of claim 15 wherein one or more of the key indicator and the encrypted password are encoded in a machine-readable code.

* * * * *